Sept. 18, 1928.
E. W. N. BOOSEY
1,684,571
FERRULE FOR CONNECTING PLUMBING FITTINGS WITH PIPING
Filed July 3, 1926
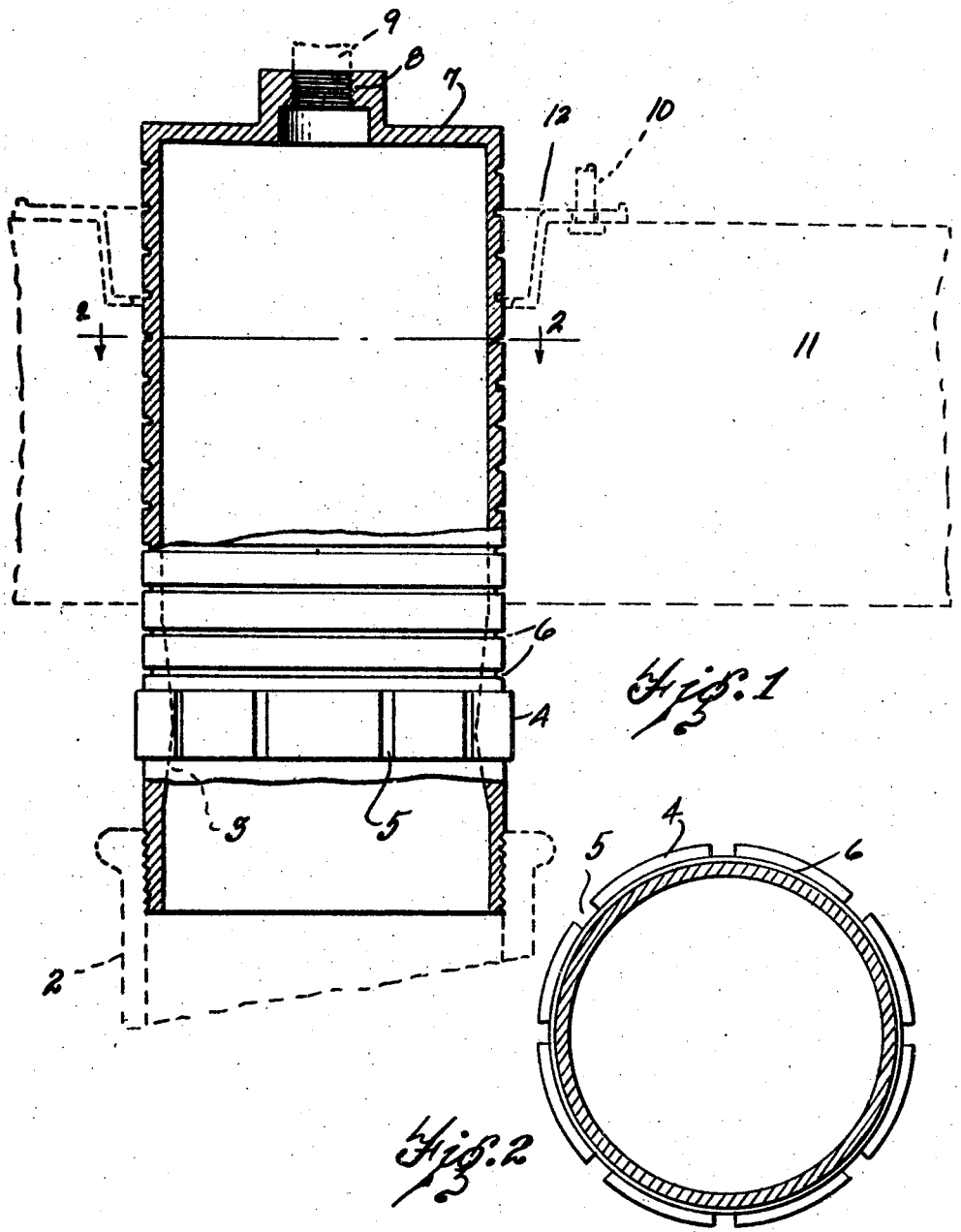
INVENTOR.
EDWARD W. N. BOOSEY
BY
ATTORNEY.

Patented Sept. 18, 1928.

1,684,571

UNITED STATES PATENT OFFICE.

EDWARD W. N. BOOSEY, OF DETROIT, MICHIGAN.

FERRULE FOR CONNECTING PLUMBING FITTINGS WITH PIPING.

Application filed July 3, 1926. Serial No. 120,367.

This invention relates to ferrules for the connection of a closet with Durham or threaded pipe work usually utilized in plumbing installations for residences.

The purpose of this invention is to provide a ferrule that may be cut to length upon the completion of a building, and that provides a ready means for testing the work subsequent to installation and is of a character to prevent filling of the piping with waste material such as plaster, shavings etc., that heretofore in open work tends to clog the piping.

In plumbing installations the Durham type of fittings are of a standard size and, inasmuch as the floor levels and the distance between the fitting and terminal portion of the piping varies due to the usual inaccuracies in the floor levels and distance between floors, it is a difficult matter to properly fit the parts.

An object of my invention is to provide a fitting that is universally adaptable for the connection of a closet or like fitting with the piping and that remains in place until the building has been completely finished and then may be cut to the desired length. It is also an object of the invention to provide an inexpensive cast iron structure for this purpose that is of sufficient strength to withstand the strain incident to erection, that may be readily and cheaply attached and avoids necessity of an accurate fitting of the parts.

These and other objects and the several novel features of the invention are hereinafter more fully described and claimed, and the preferred form of construction of a ferrule embodying my invention is shown in the accompanying drawings in which—

Fig. 1 is an elevation partly in section showing my improved ferrule or closet connection in its relation with the base of a closet fitting.

Fig. 2 is a section taken on line 2—2 of Fig. 1.

In the drawing 1 indicates the usual base member of a closet fitting to which my ferrule is to be attached connecting the same with the piping which is indicated at 2. The ferrule is usually caulked to the member 1 and is provided with a threaded lower end for connection with the pipe 2 and adjacent the lower end the wall of the ferrule is made thicker as indicated at 3 to secure strength. Exteriorly of the walls at this strengthened point is provided a portion 4 of greater diameter and notched as indicated at 5 for the use of a spanner wrench thereon. Above this portion 4 the wall of the ferrule is provided with a series of circumferential grooves 6 spaced a short distance apart which provide weakened portions in the walls and, being made of cast iron, enables the ferrule to be severed at any of the desired grooves through the use of a chisel. Thus, subsequent to an installation the part of the ferrule which projects upwardly through the portion 1 with which it is connected may be cut off. The ferrule is originally made with a closed end portion 7 which has a central apertured end threaded boss 8 with which a plug may be utilized to seal the same as indicated by dotted lines 9. The purpose of the closed end member and threaded boss 8 is to provide a convenient connection for a testing apparatus by means of which it may be determined as to whether or not the installed system would permit of leakage. This is usually accomplished by attaching a pipe to this threaded opening 8 and subjecting the piping system to water pressure. Subsequent to this testing the plug 9 is inserted and the plumbing system remains in this closed condition until the actual completion of building and thus the ferrule and the piping are sealed in a manner to prevent waste material such as plaster, shavings etc., being introduced into the piping. On completion of the building and by use of an ordinary chisel and hammer the upper end to the extent to which it projects through the fitting may be removed and the closet fixture mounted in proper relation therewith, it being usually attached by bolts 10 to the member 1.

By the arrangement of circumferential grooves 6 and thereby providing for the ready removal of the projecting end portion of the ferrule, this ferrule is adapted to be used universally with this type of threaded pipe work without necessity of utilizing a part that is of a specific standard length which through variation in building construction is oftentimes too short or too long. The reinforced portion near the lower end provides a ferrule of a construction that will not crush or deform under the strain of a wrench by means of which it is attached to the piping.

This device also enables the parts of the plumbing system to be erected without necessity of accurate measurement between the pipe end and the fitting to which the pipe is to be connected which is usually set in a cement floor for instance, the thickness of which varies under the various conditions and in which the member 1 is to be set as indicated by dotted lines 11 in Fig. 1. By caulking the ferrule end to the member 1, as indicated at 12, possibility of leakage between the ferrule and the member 1 is avoided.

From the foregoing description it is evident that the ferrule construction is simple in form and is particularly adapted for the purposes described.

Having thus briefly described my invention, what I claim and desire to secure by Letters Patent of the United States is—

A ferrule for connecting a plumbing fitting with a pipe comprising a hollow tubular member open at one end and externally threaded at the said end for introduction into the pipe, a portion of the wall of the ferrule above the threaded end being of greater thickness than the remaining portion thereof, a shoulder portion provided on the exterior of the member at the said thicker wall portion of a form to provide a wrench hold, the wall of the ferrule above the wrench hold being formed with spaced circumferential grooves providing weakened lines along any one of which said ferrule may be severed, the opposite end of the ferrule being closed by a wall integral therewith, a central projecting boss at said closed end having a threaded aperture to receive a plug for closing the same.

In testimony whereof I sign this specification.

EDWARD W. N. BOOSEY.